3,094,568
PROCESS FOR ALKYLATING AROMATICS IN THE PRESENCE OF A HEAVY METAL HALIDE, AN ORGANIC HALIDE AND AN ORGANO ALUMINUM HALIDE
Russell G. Hay, Gibsonia, and Stanley M. Hazen, Indiana Township, Allegheny County, Pa., assignors to Gulf Research & Development Company, Pittsburgh, Pa., a corporation of Delaware
No Drawing. Filed Dec. 1, 1959, Ser. No. 856,346
11 Claims. (Cl. 260—671)

This invention relates to a process for preparing an alkyl aromatic.

Alkyl aromatics are prepared in accordance with the process of this invention by reacting an alkylatable aromatic hydrocarbon with an olefin in the presence of a catalyst mixture containing an organo aluminum halide, a heavy metal halide and an organic halide. Operation in accordance with such process results in a product predominating in an alkyl aromatic hydrocarbon having one more alkyl group than the reactant aromatic hydrocarbon, with the added alkyl generally having the same number of carbon atoms as the alkylating olefin. Lesser amounts of polyalkylated aromatics are also formed. The amount of olefin polymer obtained is extremely small.

Any alkylatable aromatic hydrocarbon can be employed in the reaction, whether it be solid or liquid, mononuclear, dinuclear or polynuclear, substituted or unsubstituted. Among the mononuclear alkylatable aromatic hydrocarbons which are preferred are benzene and substituted benzenes containing as substituents from one to three alkyl radicals having from one to 20 carbon atoms, preferably from one to 10 carbon atoms. Among the dinuclear alkylatable aromatic hydrocarbons which are preferred are naphthalene and substituted naphthalenes containing as substituents from one to four alkyl radicals having from one to 20 carbon atoms, preferably from one to 10 carbon atoms. Examples of alkylatable aromatic compounds which can be employed are benzene, toluene, ethylbenzene, xylenes, tetralin, cumene, diisopropylbenzenes, n-octylbenzene, 2-phenyl-4-ethyloctadecane, naphthalene, isopropylnaphthalenes, diisopropylnaphthalenes, 1-ethyl-6-isobutylnaphthalene, 1,2,4-triisopropylbenzene, phenanthrene, etc. In the event the alkylatable aromatic compound is normally liquid, no extraneous solvent need be employed in the reaction. With a normally solid alkylatable hydrocarbon an inert solvent such as heptane, hexane, isooctane, etc., can be employed.

While olefins having from two and up to 30 carbon atoms can be employed in the alkylation reaction, olefins having from two to 20 carbon atoms are preferred. Examples of olefins which can be employed are ethylene, propylene, isobutylene, butene-1, cis-butene-2, trans-butene-2, pentene-1, cyclopentene, cyclohexene, cycloheptene, 4-methylcyclooctene, 2-methylbutene-1, 2-methylbutene-2, 3-methylbutene-1, cis-pentene-2, trans-pentene-2, hexene-1, cis-hexene-2, trans-hexene-2, 5,6-dimethylheptene-1, tetrapropylene, pentadecene-1, 6-cyclohexyldodecene-1, 4-n-nonyldodecene-1, n-tetracosene-1, n-heptacosene-1, 13-cyclopentylpentacosene, etc.

The amount of olefin which need be present at any moment during the reaction can of course be small. While the total amount of olefin which will be required for the reaction can be added to the reaction zone initially with the alkylatable aromatic compound this is not preferred because of the tendency of some of the olefin to polymerize. Desirably a small amount of olefin is added to the reaction zone as the reaction progresses and until the reaction ceases. The total olefin consumed will of course vary with the alkylatable aromatic compound and olefin employed, the pressure, temperature, reaction time, catalysts, etc. In general the total amount of olefin employed can be at least about 0.1 mol, but preferably 0.2 to about 10 mols, per mol of alkylatable aromatic compound.

The organo aluminum halide which forms one of the active agents in the catalyst system employed can be defined by the formula $R_aAlX_b$, wherein R can be an aromatic radical such as phenyl, tolyl, xylyl, etc.; or an alkyl group having from one to 10 carbon atoms, preferably from one to four carbon atoms, such as methyl, ethyl, propyl, isopropyl, isobutyl, normal butyl, etc.; X is a halogen atom selected from the group consisting of fluorine, chlorine, bromine and iodine; and $a$ and $b$ are values from one to two. Examples of organic aluminum halides which can be employed are ethylaluminum sesquichloride, methyl-aluminum sesquichloride, ethylaluminum sesquibromide, isobutylaluminum sesquichloride, diethylaluminum chloride, ethylaluminum sesquifluoride, n-butylaluminum dibromide, decylaluminum sesquichloride, methylaluminum sesquiiodide, etc.

The heavy metal halide which is employed in conjunction with the remaining components in the catalyst system can be defined as a halide selected from the group consisting of fluorine, chlorine, bromine and iodine, of a metal selected from the group consisting of titanium, zirconium, hafnium, molybdenum, antimony and tin. Metal halides which can be employed are titanium tetrachloride, titanium trichloride, zirconium tetrachloride, zirconium tetrabromide, molybdenum pentachloride, molybdenum hexafluoride, hafnium tetraiodide, hafnium tetrafluoride, antimony trichloride, antimony tribromide, stannic tetrabromide, stannic tetraiodide, etc. Of these titanium tetrachloride is preferred.

The organic halide which forms the remaining component of the catalyst system can be defined by the formula, $R_3CX$, wherein R can be an aromatic radical such as phenyl, tolyl, etc.; or an alkyl radical having from one to 10 carbon atoms, preferably from one to four carbon atoms, such as methyl, ethyl, propyl, isopropyl, isobutyl, normal butyl, etc.; and X is a halogen atom selected from the group consisting of fluorine, chlorine, bromine and iodine. Each of the R's in the formula immediately above need not be the same.

In order to obtain the desired alkylation reaction of this invention it is critical that the proper amounts of each of the components of the catalyst system be employed. Based on the total catalyst employed, the organo aluminum halide must be about two to about 60 mol percent thereof, the heavy metal halide about one to about 30 mol percent, and the organic halide about 15 to about 97 mol percent. The molar ratio of said heavy metal halide to said organo aluminum halide in any event must be at least about one to nine to about nine to one. Most critical in this respect is the organic halide, for if amounts less than that defined are employed, little alkylation occurs and increased olefin polymerization results. In general the total amount of catalyst required must be at least about 0.1 millimol of combined catalyst per mol of alkylatable aromatic compound, preferably about one to about 10 millimols of catalyst per mol or alkylatable aromatic compound.

The reaction pressure is not critical and can be varied over a wide range. Thus a pressure of about atmospheric to about 500 pounds per square inch gauge or more can be employed. The temperature similarly is not critical and can be varied over a wide range, for example from about 0° to about 200° C., preferably about 50° to about 100° C. A temperature of about 60° C. has been found to be extremely satisfactory. The contact time is also not critical and can range from about one to about four hours.

After the reaction has been completed the catalyst is deactivated and further reaction terminated in any convenient manner, for example, by hydrolyzing the same with a compound containing an active hydrogen such as water or methanol. The products can be recovered by the simple expedient of distillation.

The process of this invention can further be illustrated by reference to the following examples whose data are summarized below in Table I. In each instance there was employed a catalyst system containing 0.27 millimol of titanium tetrachloride per mol of benzene, 0.53 millimol of diisobutyl aluminum chloride per mol of benzene and varying amounts of tertiary butyl chloride per mol of benzene as defined below in Table I. Varying amounts of 4-methyl pentene-1 were also present in the hope it would serve as an additional source of carbonium ions for promoting the reaction. The catalyst and 4-methyl pentene-1, when used, were aged for one hour at 30° C. in 20 cc. of benzene, after which 380 cc. of additional benzene was added. With the pressure of the reaction being held at atmospheric and the temperature at 60° C., ethylene at a rate slightly greater than the rate of consumption thereof was introduced into the reaction system over a period of four hours. At the end of the reaction period the products were recovered by distillation. The results obtained are tabulated below in Table I.

Table I

| Example | t-Butyl Chloride, Millimols/ Mol of Benzene | 4-Methyl Pentene-1, Millimols/ Mol of Benzene | Olefin Consumed, Grams | Insoluble Polymer, Grams | Alkylated Product, Grams |
|---|---|---|---|---|---|
| I | 1.33 | 1.33 | 28.4 | 3.0 | 67.5 |
| II | 1.33 | | 31.5 | 5.9 | 63.7 |
| III | 0.13 | 0.13 | 78.1 | 71.3 | 11.3 |
| IV | | 1.33 | 38.2 | 39.6 | 0.2 |

It will be seen from Example I in Table I that operation in accordance with the process of this invention results in a product predominating in the desired alkylated aromatic with only small amounts of undesirable polymer. That the 4-methyl pentene-1 which had been used for the purpose of supplying carbonium ions in the hope that it would thereby favorably influence the course of the reaction, did not appreciably change the course of the reaction can be seen from Example II wherein it was not used. Example III clearly shows that in order to obtain the desired alkylated product the amount of organic halide employed is critical. Example IV further shows that 4-methyl pentene-1 has no appreciable alkylating effect.

In order to identify the alkylated product obtained, the alkylated product of Examples I and II was further analyzed. The alkylated product of Examples I and II, after removal of benzene, predominated in monoalkyl benzene. In Example I, 57.9 percent by weight of the product was ethyl benzene, 30.7 percent higher liquid alkylated benzenes boiling up to about 386° C. and 11.4 percent higher solid alkyl benzenes boiling above about 383° C. In Example II, 49.7 percent by weight of the alkylated product was ethyl benzene, 34.0 percent higher liquid alkylated benzenes boiling up to about 376° C. and 16.3 percent higher solid alkylated benzenes boiling above about 376° C.

Obviously, many modifications and variations of the invention, as hereinabove set forth, can be made without departing from the spirit and scope thereof, and therefore only such limitations should be imposed as are indicated in the appended claims.

We claim:

1. A process for alkylating an alkylatable aromatic which comprises reacting said alkylatable aromatic with an olefin in the presence of a catalyst system containing a heavy metal halide selected from the group consisting of the halides of titanium, zirconium, hafnium, molybdenum, antimony and tin, an organic halide defined by the formula $R_3CX$ wherein R is selected from the group consisting of an alkyl radical and an aromatic radical and X is a halogen and an organo aluminum halide, the molar ratios of said compounds in said catalyst system being, respectively, about one to about 30 mol percent, about 15 to about 97 mol percent and about two to about 60 mol percent.

2. A process for alkylating an alkylatable aromatic which comprises reacting said alkylatable aromatic with an olefin in the presence of a catalyst system containing a heavy metal halide selected from the group consisting of the halides of titanium, zirconium, hafnium, molybdenum, antimony and tin, an alkyl halide defined by the formula $R_3CX$ wherein R is an alkyl radical and X is a halogen and an organo aluminum halide, the molar ratios of said compounds in said catalyst system being, respectively, about one to about 30 mol percent, about 15 to about 97 mol percent and about two to about 60 mol percent.

3. A process for alkylating an alkylatable aromatic which comprises reacting said alkylatable aromatic with an olefin in the presence of a catalyst system containing a heavy metal halide selected from the group consisting of the halides of titanium, zirconium, hafnium, molybdenum, antimony and tin, an aryl halide defined by the formula $R_3CX$ wherein R is an aromatic radical and X is a halogen and an organo aluminum halide, the molar ratios of said compounds in said catalyst system being, respectively, about one to about 30 mol percent, about 15 to about 97 mol percent and about two to about 60 mol percent.

4. A process for alkylating an alkylatable aromatic which comprises reacting said alkylatable aromatic with an olefin in the presence of a catalyst system containing a heavy metal halide selected from the group consisting of the halides of titanium, zirconium, hafnium, molbdenum, antimony and tin, an alkyl halide defined by the formula $R_3CX$ wherein R is an alkyl radical and X is a halogen and an alkyl aluminum halide, the molar ratios of said compounds in said catalyst system being, respectively, about one to about 30 mol percent, about 15 to about 97 mol percent and about two to about 60 mol percent.

5. A process for alkylating an alkylatable aromatic which comprises reacting said alkylatable aromatic with an olefin in the presence of a catalyst system containing titanium tetrachloride, an alkyl halide defined by the formula $R_3CX$ wherein R is an alkyl radical and X is is a halogen and an alkyl aluminum halide, the molar ratios of said compounds in said catalyst system being, respectively, about one to about 30 mol percent, about 15 to about 97 mol percent and about two to about 60 mol percent.

6. A process for alkylating an alkylatable aromatic which comprises reacting said alkylatable aromatic with an olefin in the presence of a catalyst system containing titanium tetrachloride, tertiary butyl chloride and an alkyl aluminum halide, the molar ratios of said compounds in said catalyst system being, respectively, about one to about 30 mol percent, about 15 to about 97 mol percent and about two to about 60 mol percent.

7. A process for alkylating an alkylatable aromatic which comprises reacting said alkylatable aromatic with an olefin in the presence of a catalyst system containing titanium tetrachloride, tertiary butyl chloride and diisobutyl aluminum chloride, the molar ratios of said compounds in said catalyst system being, respectively, about one to about 30 mol percent, about 15 to about 97 mol percent and about two to about 60 mol percent.

8. A process for alkylating benzene which comprises reacting benzene with an olefin in the presence of a catalyst system containing titanium tetrachloride, tertiary butyl chloride and diisobutyl aluminum chloride, the molar ratios of said compounds in said catalyst system being, respectively, about one to about 30 mol percent, about 15 to about 97 mol percent and about two to about 60 mol percent.

9. A process for alkylating benzene which comprises reacting benzene with ethylene in the presence of a catalyst system containing titanium tetrachloride, tertiary butyl chloride and diisobutyl aluminum chloride, the molar ratios of said compounds in said catalyst system being, respectively, about one to about 30 mol percent, about 15 to about 97 mol percent and about two to about 60 mol percent.

10. A process for alkylating benzene which comprises reacting benzene with ethylene in the presence of a catalyst system containing titanium tetrachloride, tertiary butyl chloride and diisobutyl aluminum chloride, the molar ratios of said compounds in said catalyst system being, respectively, about one to about 30 mol percent, about 15 to about 97 mol percent and about two to about 60 mol percent at a temperature of about 50° to about 100° C.

11. A process for alkylating benzene which comprises reacting benzene with ethylene in the presence of a catalyst system containing titanium tetrachloride, tertiary butyl chloride and diisobutyl aluminum chloride, the molar ratios of said compounds in said catalyst system being, respectively, about one to about 30 mol percent, about 15 to about 97 mol percent and about two to about 60 mol percent at a temperature of about 60° C.

References Cited in the file of this patent

UNITED STATES PATENTS

| | | |
|---|---|---|
| 2,304,290 | Van Peski | Dec. 8, 1942 |
| 2,824,145 | McCall el al. | Feb. 18, 1958 |

OTHER REFERENCES

Grosse et al., J. Org. Chem. 1, 559–666 (1937).